United States Patent [19]

Furukawa

[11] Patent Number: 4,575,756

[45] Date of Patent: Mar. 11, 1986

[54] DECODER FOR A FRAME OR FIELD SKIPPED TV SIGNAL WITH A REPRESENTATIVE MOVEMENT VECTOR USED FOR INDIVIDUAL VECTORS

[75] Inventor: Akihiro Furukawa, Tokyo, Japan

[73] Assignee: NEC Corporation, Japan

[21] Appl. No.: 634,126

[22] Filed: Jul. 25, 1984

[30] Foreign Application Priority Data

Jul. 26, 1983 [JP] Japan .............................. 58-136127
Oct. 14, 1983 [JP] Japan .............................. 58-191868

[51] Int. Cl.$^4$ .............................................. H04N 7/12
[52] U.S. Cl. .................................................. 358/136
[58] Field of Search ................. 358/133, 135, 136, 105

[56] References Cited

U.S. PATENT DOCUMENTS 4,307,420 12/1981 Ninomiya et al. ................... 358/136
4,460,923 7/1984 Hirano ................................ 358/136

Primary Examiner—Joseph A. Orsino, Jr.
Attorney, Agent, or Firm—Ostrolenk, Faber, Gerb & Soffen

[57] ABSTRACT

In order to interpolate each instantaneous picture skipped between a preceding and a succeeding picture in a moving picture signal comprising a movement vector signal, a decoder comprises a movement region detector responsive to the moving picture signal for detecting a movement region for a moving or movable body in each of the preceding and the succeeding pictures, a vector selector for selecting a representative movement vector for each movement region from individual movement vectors reproduced from the movement vector signal, and an interpolator responsive to the movement region and the representative movement vector for interpolating the skipped picture between the preceding and the succeeding pictures. Preferably, the decoder is a predictive decoder for a moving picture signal of the above-mentioned type and including a prediction error signal for the movement vector signal. The vector selector selects the representative movement vector in consideration of that significance of each reproduced movement vector which is evaluated by the prediction errors represented by the prediction error signal. In either event, the representative movement vector may be the individual movement vector which is most frequent in each movement region. Alternatively, the representative movement vector may be an average of the individual movement vectors in each movement region.

7 Claims, 11 Drawing Figures

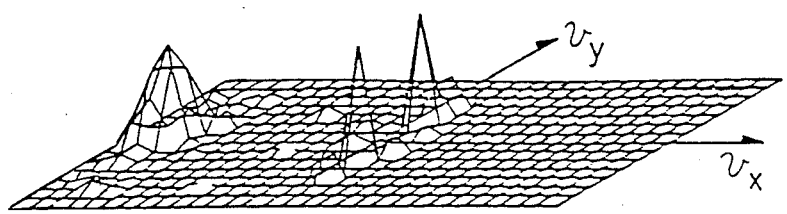
_FIG. 7_
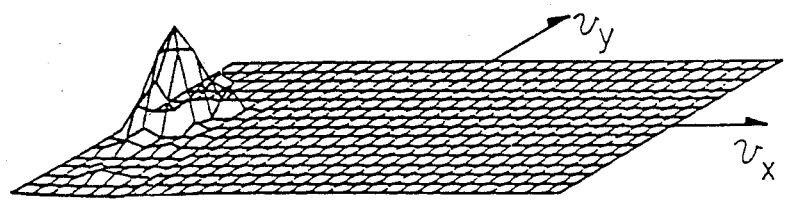
_FIG. 8_

(A) | $e_{-1,1}$ | | $e_{1,3}$ | | $e_{3,5}$ | |

(B) | $v_{-1,1}$ | | $v_{1,3}$ | | $v_{3,5}$ | |

(C) | −1 | 1 | 1 | 3 | 3 | 5 |

(D) | 1 | 1 | 3 | 3 | 5 | 5 |

(E) | 0 | 1 | 2 | 3 | 4 | 5 |

| 0 | 1 | 2 | 3 | 4 | 5 |

FIG. 11.

DECODER FOR A FRAME OR FIELD SKIPPED TV SIGNAL WITH A REPRESENTATIVE MOVEMENT VECTOR USED FOR INDIVIDUAL VECTORS

BACKGROUND OF THE INVENTION

This invention relates to a decoder with interpolation of a frame or a field which is skipped or omitted in a moving picture signal transmitted from an encoder to the decoder.

The moving picture signal is typically the picture signal of a television signal. The moving picture signal will therefore be referred to as a television signal in the following description. The television signal represents a sequence of frames and/or fields. As the case may be, either of the frames and the fields will be called an instantaneous picture.

On transmitting a television signal to a receiver, which is typically used in a satellite station of a television broadcast network, at least one instantaneous picture is skipped between a preceding and a succeeding or subsequent instantaneous picture in order to reduce the redundancy in the information transmitted by the television signal from a transmitter to the receiver. Each skipped instantaneous picture is interpolated in the receiver by the use of either or both of signal parts representative of the preceding and the succeeding instantaneous pictures. Such skip of at least one instantaneous picture between the preceding and the succeeding instantaneous pictures is desirous also in a picture recording and reproducing system in reducing the memory capacity of a memory for the television signal.

It is to be noted in connection with the preceding and the succeeding instantaneous pictures that the succeeding instantaneous picture for a skipped instantaneous picture serves as the preceding instantaneous picture for another skipped instantaneous picture which is spaced by the succeeding instantaneous picture for the first-mentioned skipped instantaneous picture, namely, by the preceding instantaneous picture for the last-mentioned skipped instantaneous picture. It is believed that no confusion will arise even the expression "an instantaneous picture" is used in place of the words "a signal part." Furthermore, it will be assumed merely for brevity of the description that the frames are alternatingly skipped in the television signal.

It is already known to use movement vectors in representing movement of a moving or movable body from each instantaneous picture to a next succeeding instantaneous picture. The movement vectors are useful in interpolating each skipped instantaneous picture as an interpolated instantaneous picture. The moving body may be still or stationary in some consecutive instantaneous pictures. In this event, each movement vector becomes a zero vector. Each instantaneous picture may show a plurality of moving bodies. Inasmuch as frame skipping is assumed, the instantaneous pictures will hereafter be called frames.

On resorting to the movement vectors, each frame is either one-dimensionally or two-dimensionally divided into a predetermined number of picture blocks of a common area so that the picture blocks of a frame be in one-to-one correspondence to those in another frame. Each picture block usually consists of a plurality of picture elements. The movement vectors are detected or calculated for the respective picture blocks of each frame as will later be described in detail.

For the time being, a definition of each movement vector will be given as follows. Let a part of a moving body be in a particular one of the picture blocks of a first frame and the part be in a specific one of the picture blocks of a second frame which is next subsequent to the first frame. The movement vector for one of the particular and the specific picture blocks may be a radius vector having a starting point at the particular picture block and an end or terminal point at a picture block which corresponds in the first frame to the specific picture block.

In a decoder of the receiver, movement of a moving body in each skipped frame is interpolated by using the movement vectors of one or both of the preceding and the succeeding frames. This does not always give smooth and natural movement of the moving body in the interpolated frame. By way of example, a spatially continuous line of the moving body may appear in the interpolated frame as a spatially discontinuous line at some of the picture blocks to result in a conspicuously degraded picture quality as will later be described with reference to one of eleven figures of the accompanying drawing.

A predictive encoding and decoding system is already known. On carrying out predictive encoding on a television signal comprising a movement vector signal representative of movement vectors of the type described above, a predictive encoder produces a prediction error signal which corresponds to the movement vector signal, namely, which results when predictive encoding is carried out on the movement vector signal. It has now been found that the decoder according to this invention is preferably a predictive decoder.

SUMMARY OF THE INVENTION

It is therefore an object of the present invention to provide a decoder responsive to a moving picture signal, in which at least one instantaneous picture is skipped between a preceding and a succeeding instantaneous picture, for interpolating each skipped instantaneous picture as an interpolated instantaneous picture representative of movement of an excellent picture quality.

It is another object of this invention to provide a decoder of the type described, by which the interpolated instantaneous picture is produced with no spatial discontinuity in a line which should be spatially continuous in the interpolated instantaneous picture.

It is a specific object of this invention to provide a decoder which is of the type described and is for use as a predictive decoder in producing the interpolated instantaneous picture precisely representative of actual movement of a moving body.

A decoder to which this invention is applicable, is with interpolation of each skipped instantaneous picture which is skipped in a moving picture signal between a preceding and a succeeding instantaneous picture wherein each of the skipped, the preceding, and the succeeding instantaneous pictures comprises a predetermined number of picture blocks and wherein the moving picture signal comprises a movement vector signal representative of individual movement vectors, each representative of movement of a moving body between two corresponding picture blocks in the preceding and the succeeding instantaneous pictures. The decoder includes vector reproducing means responsive to the moving picture signal for reproducing the individual movement vectors as reproduced movement vectors.

According to this invention, the decoder comprises region detecting means responsive to the moving picture signal for detecting a movement region comprising the moving body in one of the preceding and the succeeding instantaneous pictures, vector selecting means responsive to the reproduced movement vectors and with reference to the movement region for selecting that one of the reproduced movement vectors as a representative movement vector which is representative of the reproduced movement vectors in the movement region, and interpolating means responsive to the movement region and the representative movement vector for interpolating the movement in the skipped instantaneous picture.

According to a preferred aspect of this invention, the decoder is for the moving picture signal including a prediction error signal representative of prediction errors which result when predictive encoding is carried out by the use of the individual movement vectors. In the decoder, the vector selecting means comprises first means responsive to the prediction errors for producing a vector discrimination signal indicative of whether or not the reproduced movement vectors are significant, second means coupled to the vector reproducing means and responsive to the vector discrimination signal for selecting those of the reproduced movement vectors as significant movement vectors which are indicated as significant by the vector discrimination signal, and third means for selecting the representative movement vector from the significant movement vectors.

BRIEF DESCRIPTION OF THE DRAWING

FIG. 7 is a perspective view of a histogram for individual movement vectors;

FIG. 8 is a perspective view of another histogram in which those of the individual movement vectors are deleted which do not represent actual movement of a moving body;

FIG. 11 is a time chart for use in describing operation of the decoder and the interpolator shown in FIGS. 9 and 10.

DESCRIPTION OF THE PREFERRED EMBODIMENTS

Figure 1:
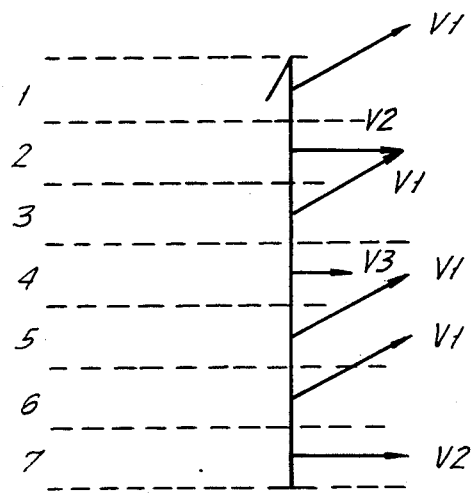
FIG. 1 shows an original pattern in a frame of a television signal together with individual movement vectors detected for picture blocks into which at least a part of the frame is divided.

Referring to FIG. 1, a pattern of the numeral "1" is exemplified as a moving or movable body represented by a television signal. In other words, the pattern "1" moves from a position in a first frame (instantaneous picture) of the television signal to another position in a second frame which is next subsequent to the first frame in a sequence of frames. Each frame or that part thereof in which the pattern "1" is present, is divided in the illustrated example one-dimensionally into first through seventh picture blocks 1, 2, . . . , and 7. Movement vectors, which may be referred to as individual movement vectors depending on the circumstances, are detected or calculated for the respective picture blocks 1 through 7 as will be described in the following paragraph.

The movement vectors are detected in practice from the television signal. Detection is carried out by searching signal parts representative of a pair of those picture blocks in the first and the second frames, respectively, in which the luminance signal has a most similar amplitude pattern. More particularly, the luminance signal amplitude pattern is detected for a particular picture block in the first frame. Luminance signal amplitude patterns are detected at least for those adjacent ones of the picture blocks of the second frame which are located at and adjacent to a picture block corresponding in the second frame to the particular picture block. Evaluation functions are calculated for the respective adjacent picture blocks. An evaluation function may be defined by a square sum of differences, each in the luminance signal amplitude between the corresponding picture elements of the particular picture block and each of the adjacent picture blocks. One of the adjacent picture blocks is selected as a specific picture block, for which the evaluation function is minimum. The movement vector is defined for either of the particular and the specific picture blocks by a pair of the particular and the specific picture blocks or by a radius vector having a starting and an end point at the particular picture block and a picture block which corresponds in the first frame to the specific picture block. It will be understood that the evaluation functions are dependent on the amplitude patterns of the luminance signal. Incidentally, each difference used in the evaluation function will be called a frame difference.

The evaluation function for each adjacent picture block may be given by a sum of absolute values of the frame differences. The movement vectors may also be detected in any one of other conventional manners. In any event, an error is inevitable in detection of the movement vectors.

In FIG. 1, movement vectors for the first, the third, the fifth, and the sixth picture blocks are designated by V1 (a usual or Roman letter being used to represent a vector instead if either a bold letter or a usual letter with an arrow thereover). Movement vectors for the second and the seventh picture blocks are denoted by V2 and that for the fourth picture block, by V3.

Figure 2:
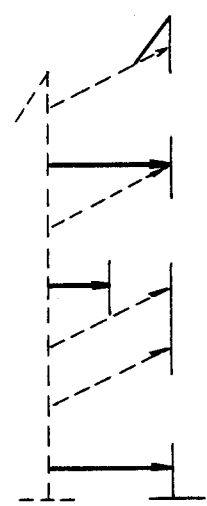
FIG. 2 shows the original pattern and a pattern in another frame interpolated by a conventional decoder.

Turning to FIG. 2, the pattern "1" is reproduced in an interpolated frame by individually using the movement vectors V1, V2, and V3. It will be assumed as described heretobefore that the frames are alternatingly skipped as skipped frames in the television signal. Each skipped frame is preceded by a preceding frame and succeeded by a succeeding frame and is interpolated as an interpolated frame in a decoder of a receiver for the television signal.

In FIG. 2, the pattern "1" in the preceding frame is depicted by a dashed line and that in the interpolated frame, by solid lines. The spatially continuous line of the pattern "1" is spatially discontinuous in the interpolated frame due to the errors in detection of the movement vectors V2 and V3. Incidentally, the interpolation may be linear. That is, a part of the moving body in each picture block of the interpolated frame is given by a half of the movement vector as will be described more in detail in the following. Alternatively, more than two preceding and succeeding frames may be used for each skipped frame in giving the part of the moving body according to interpolation of a higher order.

On describing the linear interpolation, it will be surmised that each frame is two-dimensionally divided into a predetermined number of picture blocks of the type described hereinabove. The positions of the respective picture blocks are conveniently represented by an orthogonal x-y coordinate system having an origin at the center of each frame. It will be presumed that the x axis is parallel to the horizontal lines of scan.

A movement vector will be represented by $V(x, y)$ for the particular picture block which is positioned at $(x, y)$ in the preceding frame. The signal part reproduced in the decoder for the particular picture block may be used as a signal part representative of a picture block which has a position indicated in the interpolated frame by a half of the movement vector for the particular picture block, namely, by $[V(x, y)]/2$. Alternatively, the movement vectors for either or both of the preceding and the succeeding frames are used in estimating movement vectors for the frame which should be interpolated as an interpolated frame. The movement vectors estimated for the interpolated frame may represent movement of the moving body during two frame periods. A particular movement vector will again be denoted by $V(x, y)$ for a picture block to which attention is directed in the interpolated frame as an interpolated picture block. A signal part for the interpolated picture block is given by the signal part for a particular picture block of a position which is indicated in the preceding frame by a half of the vector antiparallel to the particular movement vector, namely, by $-[V(x, y)]/2$.

Figure 3:
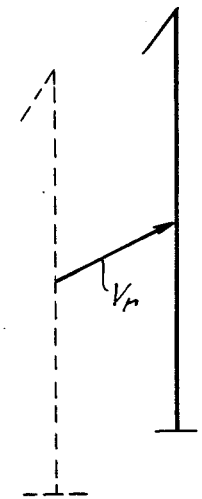
FIG. 3 shows the original pattern and a pattern in another frame interpolated by a decoder according to the instant invention.

Referring to FIG. 3, the pattern "1" is reproduced in an interpolated frame as a smooth and natural reproduction with no spatial discontinuity by a decoder according to the present invention. For this purpose, a movement region is defined at first in each frame for each moving or movable body. The movement region generally consists of a plurality of picture blocks. In other words, each picture block preferably has an area which is selected narrower than a smallest moving body in each frame. Each frame may comprise at least one stationary region where no moving or movable body is present.

The movement and the stationary regions may be represented by a picture block function $M(x, y)$, which takes binary one and zero values when the picture block of a position $(x, y)$ is in the movement and the stationary regions, respectively. It is possible to discriminate a picture block as regards the movement and the stationary regions by the movement vector for the picture block under consideration. When the movement vector has a finite magnitude and a zero magnitude, the picture block in question is in the movement and the stationary regions. Alternatively, it is possible to distinguish between the movement and the stationary regions by the signal parts for each pair of the preceding and the succeeding frames. When a predetermined threshold value is exceeded and not by the above-described evaluation function for a picture block under consideration, the picture block is in the movement and the stationary regions.

Next, the individual movement vectors for the respective picture blocks of each movement region are used in selecting a representative movement vector for that movement region. The representative movement vector may be the individual movement vector which is most frequent among the individual movement vectors in the movement region under consideration. Alternatively, the representative movement vector may be an average of the individual movement vectors in the movement region in question. In any event, the representative movement vector is depicted in FIG. 3 by Vr.

It is convenient to use the picture block function $M(x, y)$ in clearly describing the representative movement vector or vectors for each frame. A sequence of product vectors $V'(x, y)$ will be defined by:

$$V'(x, y) = M(x, y) \cdot V(x, y),$$

for the respective picture blocks of each frame. For each movement region, the representative movement vector may be given by the product vector which is either most frequent or equal to the average. Such representative movement vectors will be designated by Vf and Va. The most frequent product vector Vf will be used as the representative movement vector Vr in the following.

The interpolation is carried out with the representative movement vector Vr used for each movement region in place of the individual movement vectors. In other words, the interpolation is carried out movement region by movement region. It is to be noted in this connection that a moving body may be regarded as a rigid body for a short interval of time, such as a few frame periods. This applies more exactly when discrimination is carried out between the movement and the stationary regions with the predetermined area of each picture block selected narrower.

Figure 4:
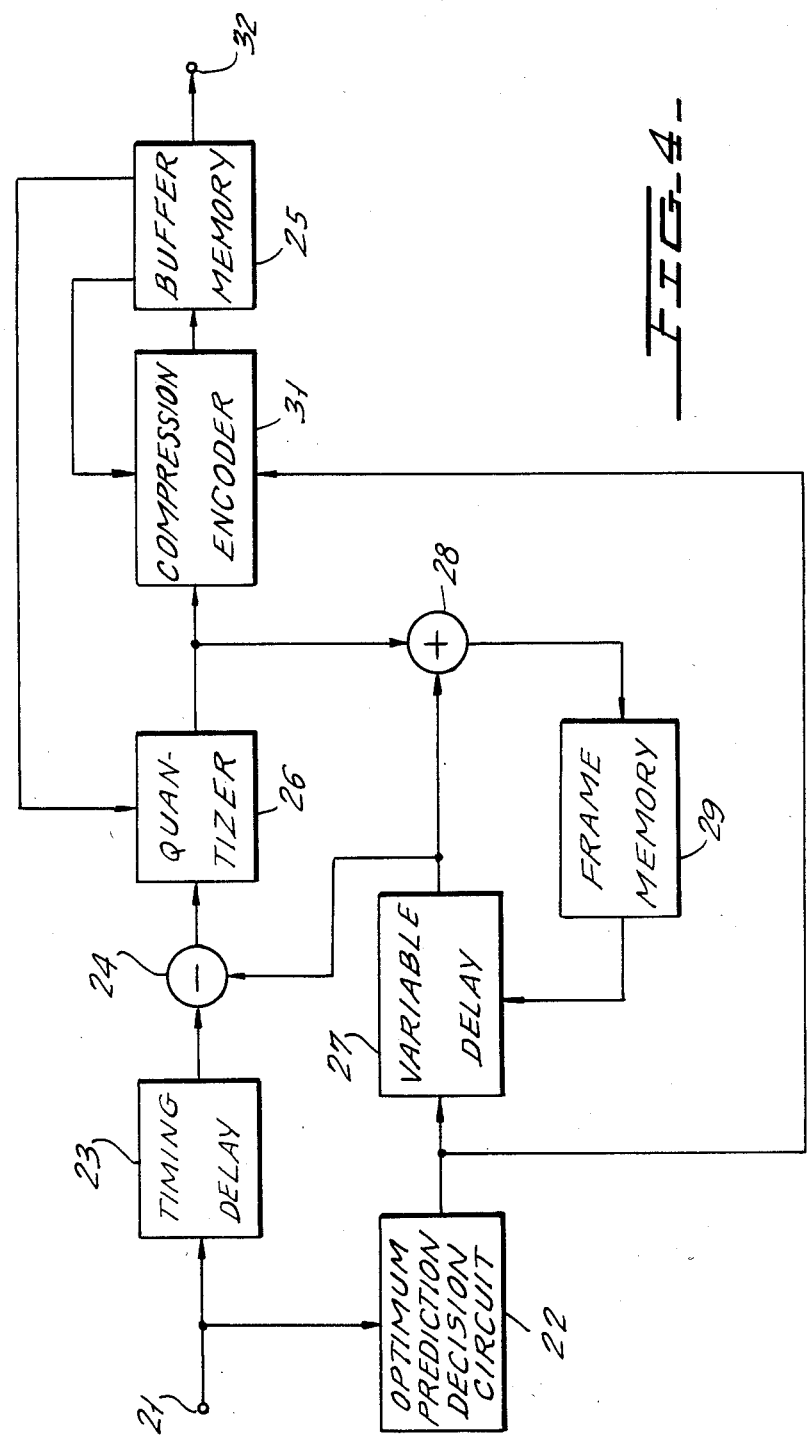
FIG. 4 is a block diagram of an encoder for use in combination with a decoder according to this invention.

Referring to FIG. 4, a predictive encoder will be described. The encoder is for producing a frame-skipped television signal with movement of each moving or movable body represented by individual movement vectors of the type described above. As will become clear as the description proceeds, the frame-skipped television signal comprises a movement vector signal representative of the individual movement vectors and a prediction error signal which corresponds to the movement vector signal, namely, which results when predictive encoding is carried out by the use of the movement vector signal. Incidentally, various predictive encoders are already known. If desired, reference may be had to U.S. Pat. No. 4,093,962 issued to Tatsuo Ishiguro et al and assigned to the present assignee.

The predictive encoder has an encoder input terminal 21 for an encoder input signal comprising a picture signal for a sequence of consecutive frames. Responsive to the encoder input signal, an optimum prediction decision circuit 22 detects or calculates individual movement vectors as described before for the respective picture blocks of each of the frames which should not be skipped. At the same time, the optimum prediction decision circuit 22 detects an optimum prediction scheme which minimizes either the prediction error or the amount of codes. The optimum prediction decision circuit 22 produces an optimum prediction scheme signal representative of the optimum prediction scheme and comprising a movement vector signal representative of the individual movement vectors for the successive frames.

A timing delay circuit 23 is for giving a timing delay to the encoder input signal to produce a delayed input signal. The timing delay should be equal to the time needed by the optimum prediction decision circuit 22 in detecting the individual movement vectors and the optimum prediction scheme. An optimum prediction signal which will presently be described, is subtracted by a subtractor 24 from the delayed input signal. The subtractor 24 thereby produces a prediction error signal.

Responsive to a quantization control signal supplied from a buffer memory 25 in the manner known in the art, a quantizer 26 quantizes the prediction error signal to produce a quantized prediction error signal. When the frame skipping should be carried out as described heretobefore, the prediction error signal produced by the quantizer 26 is quantized to a zero output level in the quantized prediction error signal.

Controlled by a memorized local decoded signal which will shortly be described, a variable delay circuit 27 gives a variable delay to the optimum prediction error signal to produce the optimum prediction signal. As described above, the optimum prediction signal is delivered to the subtractor 24. Moreover, the optimum prediction signal is added by an adder 28 to the quantized prediction error signal. The adder 28 thereby produces a local decoded signal. A frame memory 29 is for memorizing about one frame of the local decoded signal to produce the memorized local decoded signal. During a frame period of each of the preceding and the succeeding frames, the frame memory 29 produces the local decoded signal for the frame in question. For each of the skipped frames, the frame memory 29 produces the local decoded signal for the preceding frame. The signal of the type will be referred to in the following simply as a delayed signal rather than as a memorized signal.

A compression encoder 31 is for carrying out variable length encoding on the quantized prediction error signal delivered from the quantizer 26. The compression encoder 31 supplies the buffer memory 25 with an encoded signal with addition thereto of the optimum prediction scheme signal which is delivered from the optimum prediction decision circuit 22 and comprises the movement vector signal. Furthermore, the compression encoder 31 adds a skip information signal fed from the buffer memory 25 to the encoded signal while the quantized prediction error signal has the zero output level. The buffer memory 25 delivers the encoded signal to a transmission channel (not shown) through an encoder output terminal 32 as a television signal at a predetermined bit or transmission rate in the manner known in the art.

Figure 5:
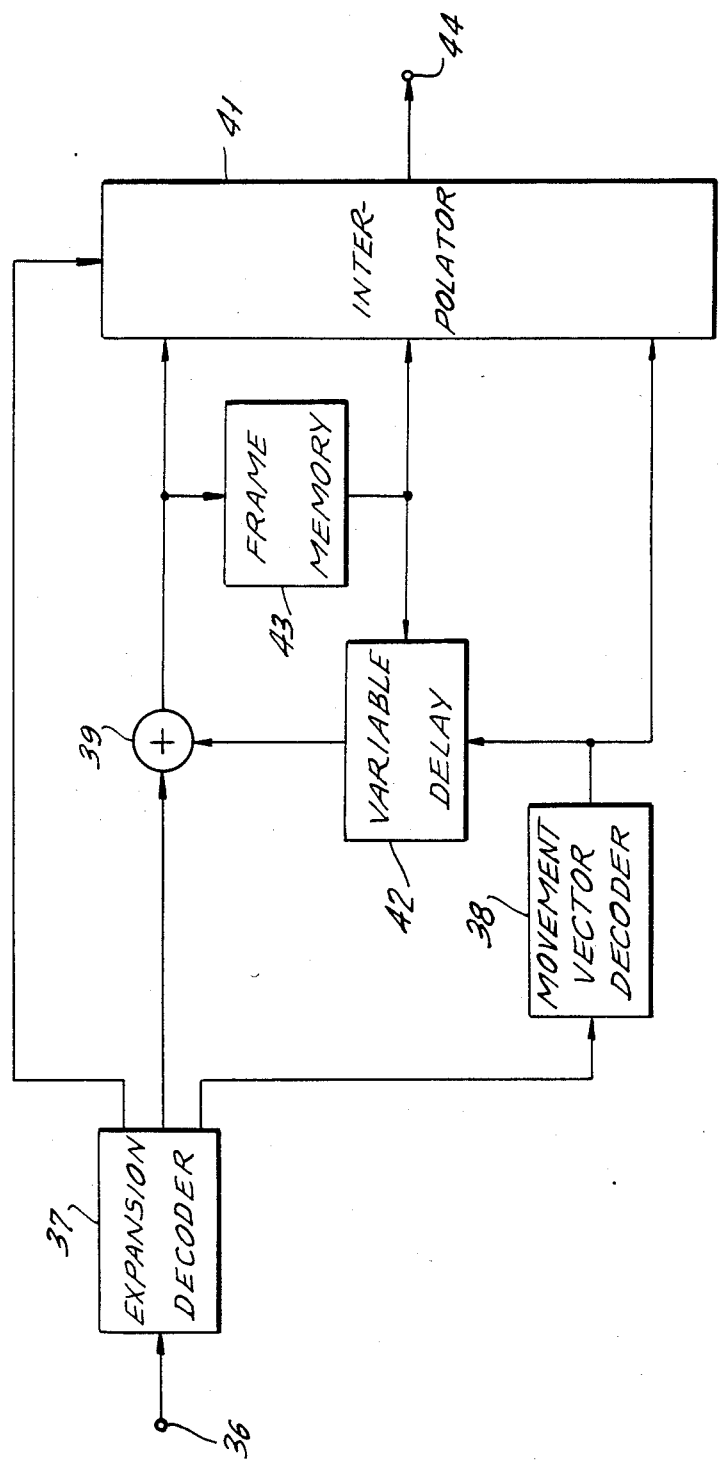
FIG. 5 is a block diagram of a decoder according to a first embodiment of this invention.

Referring to FIG. 5, a predictive decoder is a decoder according to a first embodiment of this invention and is supplied with a television signal from a predictive encoder of the type illustrated with reference to FIG. 4. The predictive decoder is for carrying out predictive decoding of the television signal with interpolation of each skipped frame which is skipped between a preceding and a succeeding frame. According to the assumption described hereinabove, only one frame is skipped between each pair of the preceding and the succeeding frames. As described before, each frame comprises a predetermined number of picture blocks. The television signal comprises a movement vector signal representative of individual movement vectors for the respective picture blocks of the successive frames. Each individual movement vector represents movement of a moving or movable body between two picture blocks in the preceding and the succeeding frames.

The predictive decoder has a decoder input terminal 36 for receiving the television signal. An expansion decoder 37 is for expansion decoding the television signal to supply a combination of a decoded optimum prediction scheme signal and a decoded skip information signal to a movement vector decoder 38, a decoded prediction error signal to an adder 39, and the decoded skip information signal to an interpolator 41. Responsive to the decoded optimum prediction scheme signal, the movement vector decoder 38 serves as an individual movement vector detecting device and supplies the interpolator 41 and a variable delay circuit 42 with a sequence of reproduced movement vectors for the successive frames. During an interval of time which corresponds to each skipped frame, the reproduced sequence represents zero vectors.

The adder 39 is for calculating a sum of the reproduced prediction error signal delivered from the expansion decoder 37 and a reproduction of the optimum prediction signal fed from the variable delay circuit 42 as will presently become clear. The adder 39 supplies the interpolator 41 and a frame memory 43 with a decoded television signal representative of the preceding and the succeeding frames, namely, the sequence of frames except the skipped frames. The frame memory 43 is for memorizing about one frame of the decoded television signal to deliver a delayed television signal to the interpolator 41 and to the variable delay circuit 42. Controlled by the reproduced optimum prediction scheme signal fed from the movement vector decoder 38, the variable delay circuit 42 gives a variable delay to the delayed television signal to produce the reproduction of the optimum prediction signal. As will shortly be described, the interpolator 41 carries out interpolation of each skipped frame into the decoded television signal and supplies a decoder output terminal 44 with an interpolated television signal as a decoder output signal.

Figure 6:
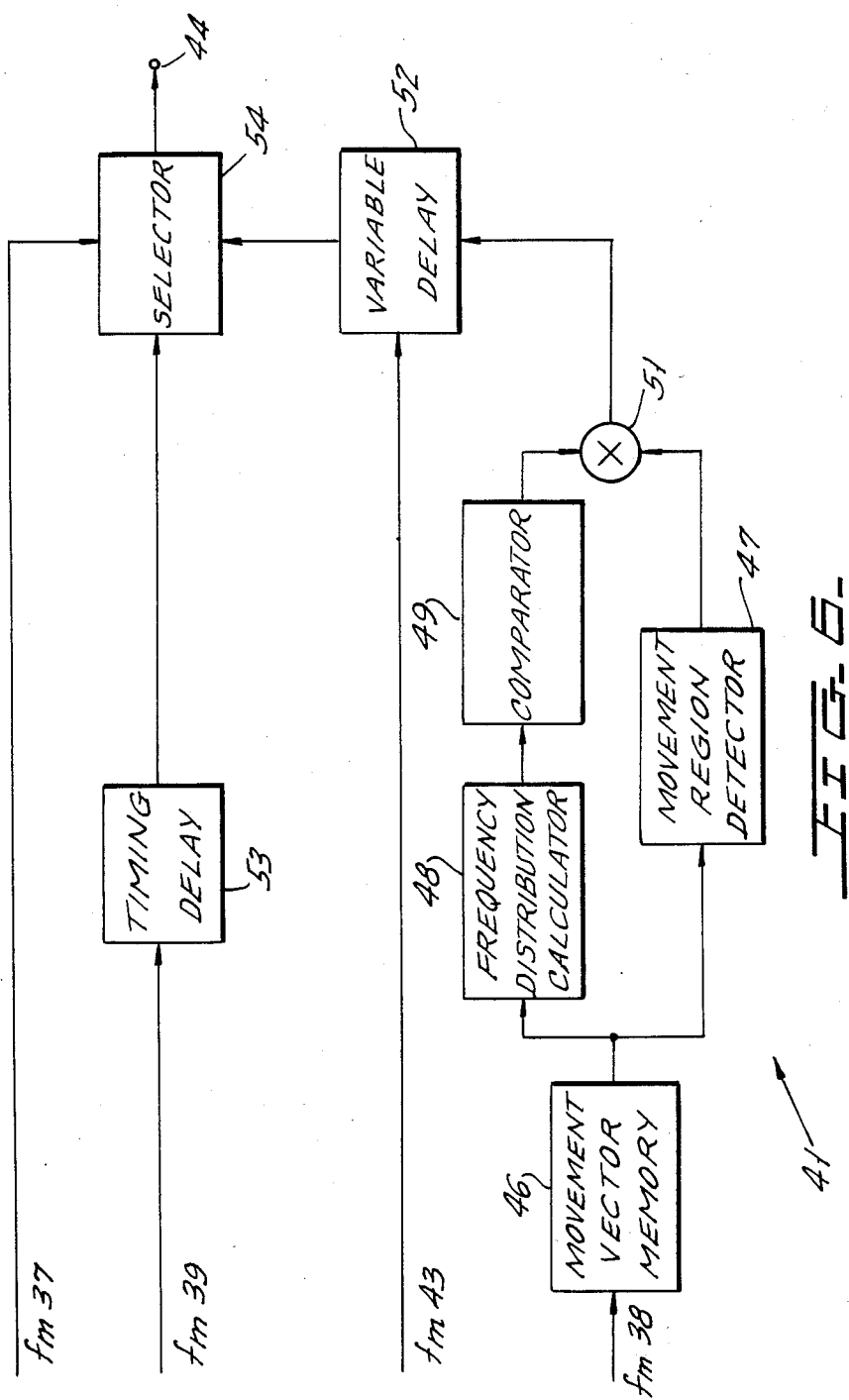
FIG. 6 is a block diagram of an interpolator for use in the decoder illustrated in FIG. 5.

Referring to FIG. 6, the interpolator 41 comprises a movement vector memory 46 for memorizing about one frame of the sequence of reproduced movement vectors. Supplied with the reproduced movement vectors from the movement vector memory 46, a movement region detector 47 detects the movement region or regions of the frame as described above to produce a movement region signal indicative of the detected movement region or regions. Although not depicted in detail, the movement region detector 47 may comprise a norm calculator, a comparator, and a movement region memory. The norm calculator calculates the norm of the reproduced movement vectors delivered from the movement vector memory 46. The comparator compares the norm with a preselected threshold value to produce a binary one signal indicative of each movement region and a binary zero signal indicative of each stationary region when the norm is and is not greater than the threshold value, respectively. The movement region memory is for memorizing the binary one and zero signals, namely, the movement region signal representative of the picture block function $M(x, y)$ described above. It is to be noted in connection with the example being illustrated that the movement region detector 47 is coupled to the individual movement vector reproducing device 38.

The reproduced movement vectors of each frame are delivered also to a frequency distribution calculator 48, which is not depicted in detail but comprises a plurality of counters and a counter specifier, both supplied with the reproduced movement vectors from the movement vector memory 46. It is to be noted that the reproduced movement vectors have discrete magnitudes, namely, a finite number of magnitudes. The number of the counters is equal to the finite number. Responsive to x and y components of each reproduced movement vector, the counter specifier specifies one of the counters that should be counted up in response to the reproduced movement vector. The frequency distribution calculator 48 supplies a comparator 49 with the counts of the respective magnitudes of the reproduced movement vectors. The comparator 49 compares one of the counts with another to select a representative movement vector for each movement region. A combination of the frequency distribution counter 48 and the comparator 49 serves as a representative movement vector selecting device.

The representative movement vector is multiplied by the picture block function M(x, y) in a multiplier 51. The representative movement vector is therefore selected in effect with reference to the movement region.

The multiplier 51 supplies a variable delay circuit 52 with a movement interpolation signal comprising the representative movement vectors for the picture blocks of each movement region and zero vectors for the picture blocks of each stationary region. Responsive to the movement interpolation signal, the variable delay circuit 52 gives a variable delay to the delayed television signal delivered from the frame memory 43 (FIG. 5) and produces an interpolated frame.

A timing delay circuit 53 is for giving a timing delay to the decoded television signal fed from the adder 39 (FIG. 5). The timing delay of the delay circuit 53 is such that the interpolated frame is produced by the variable delay circuit 52 between the preceding and the succeeding frames comprised in the decoded television signal. The timing delay circuit 53 produces a delayed preceding or succeeding frame. Controlled by the skip information signal supplied from the expansion decoder 37 (FIG. 5), a selector 54 alternatingly selects the delayed and the interpolated frames to deliver the decoder output signal to the decoder output terminal 44.

Referring now to FIG. 7, a histogram is perspectively depicted for individual movement vectors detected or calculated for a movement region of a frame (instantaneous picture) with each individual movement vector decomposed into x and y components $v_x$ and $v_y$ and consequently represented by ($v_x$, $v_y$). In other words, a frequency distribution of the individual movement vectors is exemplified on an orthogonal $v_x-v_y$ coordinate plane. The $v_x$ axis represents the x components $v_x$ and the $v_y$ axis, the y components $v_y$. It is to be noted in this connection that zero vectors should be shown at the origin of the $v_x-v_y$ coordinate plane. The zero vectors are, however, not illustrated because the number thereof may be numerous. The magnitude (the x and the y components) of each individual movement vector is given by the number of picture elements which the moving body traverses per unit time of, for example, two frame periods.

The histogram shows that most of the individual movement vectors have a magnitude of about twelve picture elements and a direction and sense in the negative direction of the x axis of the x-y coordinate system for the frame. Some of the individual movement vectors have magnitudes of nearly zero and directions and senses of the y axis. The distribution may result from the fact that a moving and a stationary region are coexistent in each of a plurality of picture blocks, such as those in which a moving body has a boundary. If given by the most frequent one of the individual movement vectors in each movement region, the representative movement vector might not represent the actual movement of the moving body.

Turning to FIG. 8, another histogram is shown wherein the nearly zero movement vectors are deleted or rejected from the individual movement vectors as surplus or superfluous movement vectors in a decoder according to a second embodiment of this invention. Only a single group of individual movement vectors remains as a group of remaining or actual movement vectors at and near a position representative of a velocity vector of a magnitude of twelve picture elements per unit time and a direction and sense of the negative direction of the x axis. When selected from the remaining movement vectors, a representative movement vector will precisely and faithfully represent the actual movement.

It is possible to use an additional evaluation function in deleting the surplus movement vectors. The previously described evaluation function was defined by the frame differences for the luminance signal amplitude and was used in detecting or calculating the individual movement vectors. Similarly, the additional evaluation function may be defined by a square sum of frame differences for the individual movement vector. Alternatively, the additional evaluation function may be defined by a sum of absolute values of the frame differences for the individual movement vector. As will readily be understood from FIGS. 7 and 8, the additional evaluation function has an appreciably great value when the individual movement vectors do not represent the actual movement. When the individual movement vectors do, the additional evaluation function has a value of zero except the influence of noise.

The movement region is preferably selected by using only the remaining movement vectors after deletion of the surplus movement vectors. A representative movement vector is selected from the remaining movement vectors in the manner described above. In other words, an area is selected at first where the individual movement vectors are not substantially equal to zero. As shown in FIGS. 7 and 8, the area comprises a true movement region and a region of the surplus movement vectors. The true movement region is next selected from the area in consideration of the additional evaluation function which can be calculated with reference to the television signal.

Figure 9:
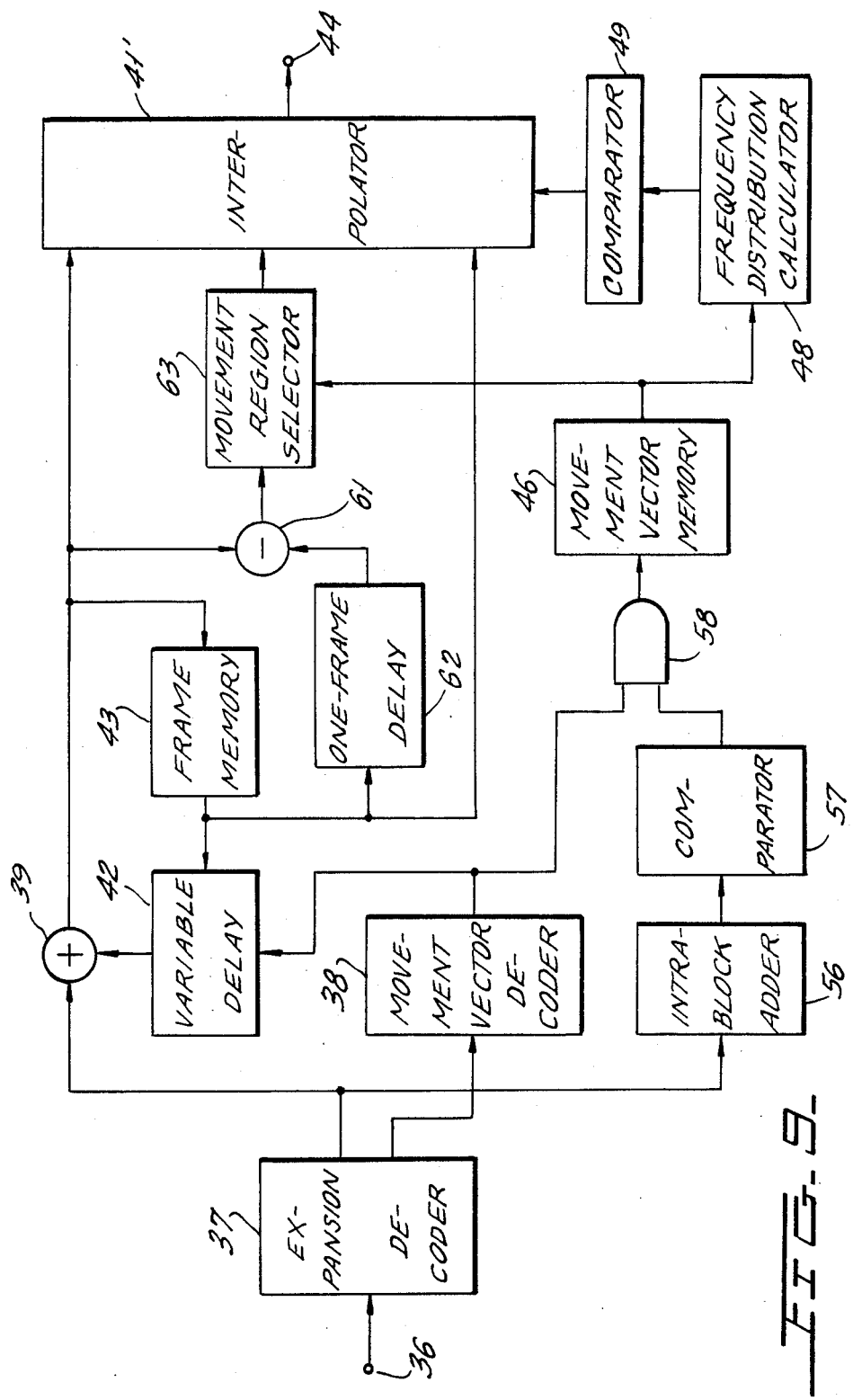
FIG. 9 is a block diagram of a decoder according to a second embodiment of this invention.

Referring to FIG. 9, a decoder mentioned in conjunction with FIG. 8 comprises similar parts designated by like reference numerals. A part of the interpolator 41 illustrated with reference to FIG. 6, is depicted in FIG. 9. The interpolator shown in FIG. 9, is therefore indicated by the reference numeral 41'. It will be assumed that the television signal delivered from an encoder of the type described with reference to FIG. 4, does not include the skip information signal but the encoded optimum prediction scheme signal and the encoded prediction error signal corresponding to the optimum prediction scheme signal.

In FIG. 9, the decoded prediction error signal is delivered from the expansion decoder 37 to an intrablock adder 56 besides the previously described adder 39. The intrablock adder 56 is for calculating a summation of either the squares of the decoded prediction errors or the absolute values thereof for each picture block to produce an intrablock summation signal representative of the summation. A comparator 57 is for comparing the intrablock summation signal with a predetermined threshold value to produce a vector discrimination signal which takes values of binary one and zero when the summation is less than the threshold value and is not, respectively.

It will be understood that the prediction errors correspond to the frame differences for the reproduced movement vector. The summation therefore serves as the above-mentioned additional evaluation function. The vector discrimination signal of the binary one value indicates that the reproduced movement vectors are significant movement vectors. In other words, the picture blocks of the significant movement vectors are in an actual movement region. The vector discrimination signal of the binary zero value indicates that the reproduced movement vectors are surplus movement vectors and are insignificant. The picture block for each surplus movement vector is not in the actual movement region.

As described before, a sequence of reproduced movement vectors is produced by the movement vector decoder 38. The reproduced movement vectors are delivered to an AND gate 58 rather than directly to the movement vector memory 46. Controlled by the vector discrimination signal, the AND gate 58 delivers the reproduced movement vectors to the movement vector memory 46 as the significant movement vectors only when the vector discrimination signal takes the binary one value. When the vector discrimination signal is binary zero, the AND gate 56 delivers zero vectors to the movement vector memory 46. The surplus or insignificant movement vectors are thus deleted.

It is now understood that a combination of the intrablock adder 56 and the comparator 57 serves as a device responsive to the prediction error signal for producing the vector discrimination signal indicative of whether or not the reproduced movement vectors are significant. The AND gate 56 serves as a device connected to the movement vector decoder 38 and responsive to the vector discrimination signal for selecting those of the reproduced movement vectors as significant movement vectors which are indicated as significant by the vector discrimination signal. The movement vector memory 46 therefore memorizes about one frame of a sequence of the significant movement vectors. Incidentally, it is possible to make the comparator 49 for the frequency distribution calculator 48 provide an interpolated movement vector by dividing the representative movement vector by two provided that the frames are alternatingly skipped as assumed heretobefore.

The decoded television signal produced by the adder 39 to represent the frames except the skipped frames, is delivered to a subtractor 61 besides the interpolator 41' and the frame memory 43. The delayed television signal is fed from the frame memory 43 to a one-frame delay circuit 62 in addition to the interpolator 41' and the variable delay circuit 42. The one-frame delay circuit 62 is for giving a delay of one frame period to the delayed television signal to produce a signal, which will be called a delayed picture signal merely for convenience of description. The subtractor 61 is for calculating a difference between the delayed television signal and the delayed picture signal to produce a difference signal representative of the difference.

In cooperation with the frame memory 43, the one-frame delay circuit 62 gives the delayed picture signal a delay of two frame periods relative to the decoded television signal produced by the adder 39. The succeeding frame for a skipped frame is therefore concurrent in the delayed picture signal with the preceding frame for the skipped frame under consideration. As a consequence, the difference signal has a level which is higher than a prescribed threshold value for each movement region.

A movement region selector 63 is similar to the movement region detector 47 described in conjunction with FIG. 6 except that the movement region selector 63 is controlled by the difference signal. Production of the movement region signal representative of each movement region in the manner described in connection with the movement region detector 47, is inhibited unless the prescribed threshold value is exceeded by the difference represented by the difference signal. In other words, the movement region selector 63 detects the movement region by referring to the difference signal and furthermore to the significant movement vectors. Incidentally, it is possible to use the movement region selector 63 together with the subtractor 61 and the one-frame delay circuit 62 in the decoder of FIG. 5 instead of the movement region detector 47 with the reproduced movement vectors supplied directly from the movement vector decoder 38 (FIG. 5).

Figure 10:
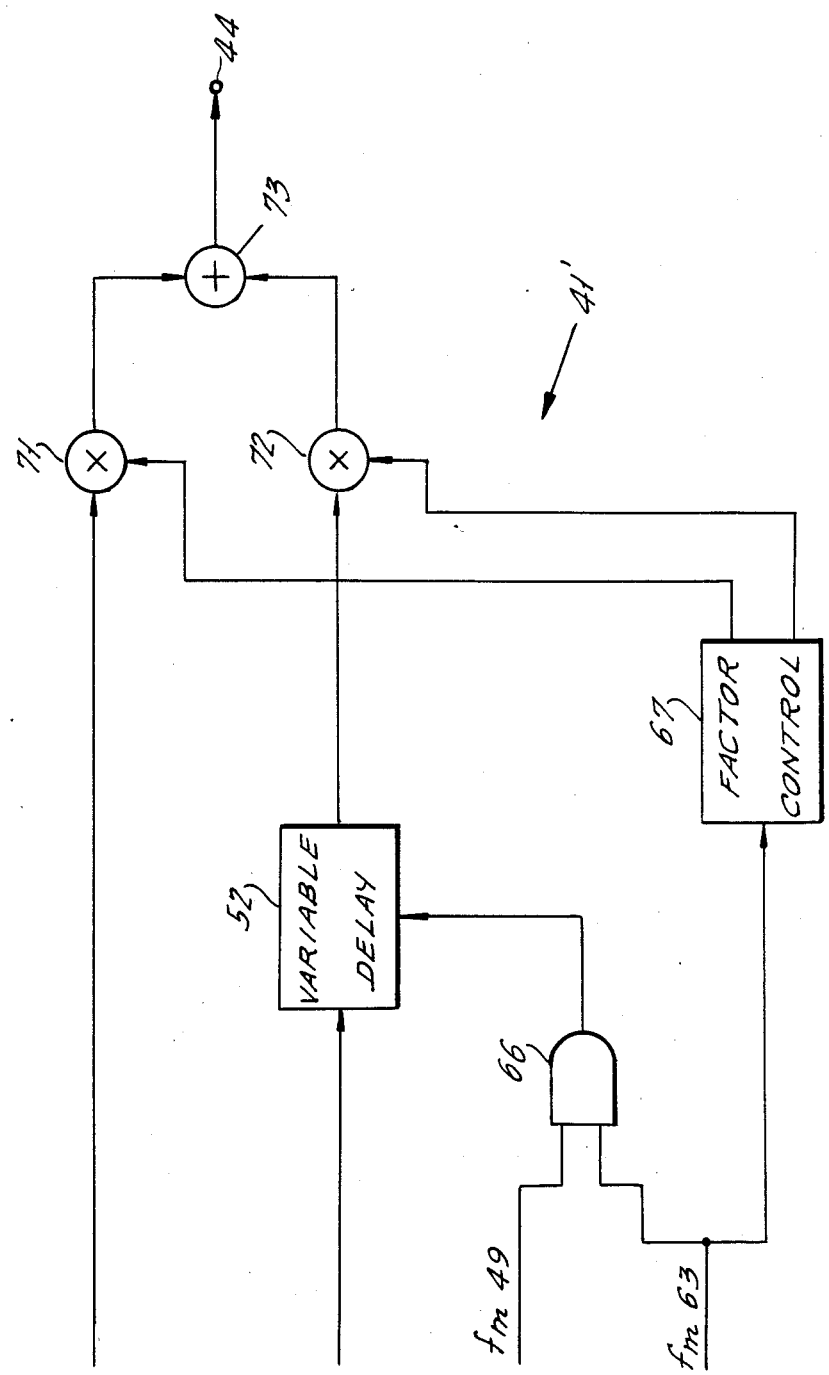
FIG. 10 is a block diagram of an interpolator for use in the decoder depicted in FIG. 9.

Referring to FIG. 10, the interpolator 41' corresponds to that part of the interpolator 41 illustrated with reference to FIG. 6 which comprises the variable and the timing delay circuits 52 and 53 and the selector 54. It should be noted, however, that the television signal for the decoder of FIG. 9 does not comprise the skip information signal as assumed above.

The interpolator 41' comprises a variable delay circuit which is similar to the delay circuit 52 of FIG. 6 and will again be designated by the reference numeral 52. The movement region signal produced by the movement region selector 63 is supplied to an AND gate 66. The interpolated movement vector is delivered from the comparator 49 to the AND gate 66 and fed therethrough to the variable delay circuit 52 only when the movement region signal is the binary one signal. As described in connection with FIG. 6, the variable delay circuit 52 produces an interpolated frame for each skipped frame.

The movement region signal is supplied furthermore to a factor control circuit 67. Depending on the movement and the stationary regions indicated by the movement region signal, the factor control circuit 67 produces weighting factors. The decoded television signal is delivered from the adder 39 to a first multiplier 71. Responsive to the weighting factors, the first multiplier 71 produces a first weighted signal. The interpolated frame is delivered from the variable delay circuit 52 to a second multiplier 72. Responsive to the weighting factors, the second multiplier 72 produces a second weighted signal. Supplied with the first and the second weighted signals, an adder 73 delivers the decoded output signal to the decoder output terminal 44.

Finally referring to FIG. 11, operation will briefly be reviewed as regards the decoder illustrated with reference to FIGS. 9 and 10. Zeroth and other frame periods 0, 1, 2, . . . are shown along a time axis depicted at the bottom of the figure. It will be assumed that the zeroth, the second, the fourth, and like frames 0, 2, 4, ... are skipped in the television signal supplied to the decoder input terminal 36.

Along a top line (A), a prediction error $e_{-1,1}$ is shown for the zeroth frame period 0 preceded by a minimum first frame (not shown) and followed by the first frame 1. Other prediction errors $e_{1,3}$ and $e_{3,5}$ are illustrated for the second and the fourth frames 2 and 4, respectively. Along a next line (B), movement vectors $v_{-1,1}$, $v_{1,3}$, and $v_{3,5}$ are likewise depicted. The prediction errors are what are represented by the decoded prediction error signal produced by the expansion decoder 37. The movement vectors comprise the reproduced movement vectors of the sequence produced by the movement vector decoder 38.

The frame memory 43 produces the delayed television signal for the minus first frame −1 during the zeroth frame period 0 as shown along a third line (C). Controlled by the reproduced movement vectors and supplied with the delayed television signal, the variable delay circuit 42 produces the reproduction of the optimum prediction signal. During the zeroth frame period 0, the adder 39 produces the decoded television signal for the first frame 1 as depicted along a fourth line (D). The frame memory 43 produces the delayed television signal for the first frame 1 repeatedly during the first and the second frame periods 1 and 2. In the meantime, the adder 39 produces the decoded television signal for the first and the third frames 1 and 3, respectively, with the decoded television signal for the second frame period 2 skipped.

As indicated along the second line (B) by each hatched area, the prediction error for each picture block is used in selecting the remaining or significant ones of the reproduced movement vectors. In the interpolator 41', the first multiplier 71 produces the first weighted signal for the first, third, and like frames 1, 3, ... as illustrated along a fifth line (E). Responsive to the delayed television signal of the fourth line (D) and in cooperation with the variable delay circuit 52, the second multiplier 72 produces the second weighted signal for the zeroth, second, and similar frames 0, 2, ... The adder 73 produces the decoder output signal as depicted along the fifth line (E).

What is claimed is:

1. A decoder with interpolation of each skipped instantaneous picture which is skipped in a moving picture signal between a preceding and a succeeding instantaneous picture, each of said skipped, said preceding, and said succeeding instantaneous pictures comprising a predetermined number of picture blocks, said moving picture signal comprising a movement vector signal representative of individual movement vectors each of which represents movement of a moving body between two corresponding picture blocks in said preceding and said succeeding instantaneous pictures, said decoder including vector reproducing means responsive to said moving picture signal for reproducing said individual movement vectors as reproduced movement vectors, wherein the improvement comprises region detecting means responsive to said moving picture signal for detecting a movement region comprising said moving body in one of said preceding and said succeeding instantaneous pictures, vector selecting means responsive to said reproduced movement vectors and with reference to said movement region for selecting that one of said reproduced movement vectors as a representative movement vector which is representative of the reproduced movement vectors in said movement region, and interpolating means responsive to said movement region and said representative movement vector for interpolating said movement in said skipped instantaneous picture.

2. A decoder as claimed in claim 1, wherein said region detecting means is coupled to said vector reproducing means to detect that region as said movement region in which said reproduced movement vectors are not substantially equal to zero.

3. A decoder as claimed in claim 2, wherein said vector selecting means is for selecting that one of said reproduced movement vectors as said representative movement vector which is most frequent among the reproduced movement vectors in said movement region.

4. A decoder as claimed in claim 2, wherein said vector selecting means is for selecting that vector as said representative movement vector which is equal to an average of the reproduced movement vectors in said movement region.

5. A decoder as claimed in claim 1, said moving picture signal including a prediction error signal representative of prediction errors which result when predictive encoding is carried out by the use of said individual movement vectors, wherein said vector selecting means comprises first means responsive to said prediction errors for producing a vector discrimination signal indicative of whether or not said reproduced movement vectors are significant, second means coupled to said vector reproducing means and responsive to said vector discrimination signal for selecting those of said reproduced movement vectors as significant movement vectors which are indicated as significant by said vector discrimination signal, and third means for selecting said representative movement vector from said significant movement ventors.

6. A decoder as claimed in claim 5, wherein said first means comprises means for calculating a summation of squares of the prediction errors in each of said picture blocks to produce a summation signal representative of said summation, and means for comparing said summation with a predetermined threshold value to produce the vector discrimination signal indicative of significance of the reproduced movement vector for said each of the picture blocks when said summation is less than said threshold value.

7. A decoder as claimed in claim 5, wherein said first means comprises means for calculating a summation of absolute values of the prediction errors in each of said picture blocks to produce a summation signal representative of said summation, and means for comparing said summation with a predetermined threshold value to produce the vector discrimination signal indicative of significance of the reproduced movement vector for said each of the picture blocks when said summation is less than said threshold value.

* * * * *